US008751567B2

(12) United States Patent
Chung et al.

(10) Patent No.: US 8,751,567 B2
(45) Date of Patent: Jun. 10, 2014

(54) QUANTIFY AND MEASURE MICRO-BLOGGING FOR ENTERPRISE RESOURCES PLANNING (ERP)

(75) Inventors: Chang Uk Chung, Mountain House, CA (US); Jason Alonzo, Fair Oaks, CA (US)

(73) Assignee: Oracle International Corporation, Redwood Shores, CA (US)

( * ) Notice: Subject to any disclaimer, the term of this patent is extended or adjusted under 35 U.S.C. 154(b) by 295 days.

(21) Appl. No.: 13/369,986

(22) Filed: Feb. 9, 2012

(65) Prior Publication Data

US 2013/0212170 A1     Aug. 15, 2013

(51) Int. Cl.
 *G06F 15/16* (2006.01)
(52) U.S. Cl.
 USPC .......... 709/203; 705/1.1; 705/7.11; 705/7.29; 705/7.36; 707/603
(58) Field of Classification Search
 USPC ................ 709/203; 705/1.1, 7.11, 7.29, 7.36; 707/603
 See application file for complete search history.

(56) References Cited

U.S. PATENT DOCUMENTS

| | | |
|---|---|---|
| 5,138,712 A | 8/1992 | Corbin |
| 6,056,786 A | 5/2000 | Rivera et al. |
| 6,421,571 B1 | 7/2002 | Spriggs et al. |
| 7,013,294 B1 | 3/2006 | Sekigawa et al. |
| 7,085,822 B1 | 8/2006 | Donatelli et al. |
| 7,313,512 B1 | 12/2007 | Traut et al. |
| 7,480,669 B2 | 1/2009 | Lo et al. |
| 7,568,018 B1 | 7/2009 | Hove et al. |
| 7,752,139 B2 | 7/2010 | Hu |
| 7,809,648 B2 | 10/2010 | Misra et al. |
| 7,890,950 B1 | 2/2011 | Nanavati et al. |
| 8,407,669 B2 | 3/2013 | Yee et al. |
| 8,504,550 B2 * | 8/2013 | Hall et al. ...................... 707/710 |
| 2003/0055749 A1 | 3/2003 | Carmody et al. |
| 2003/0154199 A1 | 8/2003 | Thomas et al. |
| 2004/0030564 A1 | 2/2004 | Hartinger et al. |
| 2004/0117784 A1 | 6/2004 | Endoh |

(Continued)

FOREIGN PATENT DOCUMENTS

| | | |
|---|---|---|
| EP | 1 811 442 A1 | 7/2007 |
| EP | 1818823 A2 | 8/2007 |

OTHER PUBLICATIONS

U.S. Appl. No. 12/576,988, filed Oct. 9, 2009, Final Office Action mailed Oct. 8, 2013, 19 pages.

(Continued)

*Primary Examiner* — Michael Y Won
(74) *Attorney, Agent, or Firm* — Kilpatrick Townsend & Stockton LLP

(57) ABSTRACT

Embodiments of the invention provide systems and methods for presenting a quantitative view of a set of information made up a number of messages. For example, these messages can comprise emails, Short Message Service (SMS) messages, Multimedia Message Service (MMS) messages, Instant Messages, and/or any of a variety of other types of messages related to an application, process, resource, etc. of a system. Embodiments of the present invention provide for categorizing each of the messages, quantifying each category based on the messages therein, applying a weight to each of the quantified categories, plotting the weighted and quantified categories on a matrix, and presenting the matrix as a summary of the weighted and quantified categories. For example, the matrix may be presented in a dashboard, portal, or other element of a user interface of an application to which the messages are related.

12 Claims, 14 Drawing Sheets

(56) References Cited

U.S. PATENT DOCUMENTS

| | | | |
|---|---|---|---|
| 2005/0222867 A1* | 10/2005 | Underwood et al. | 705/2 |
| 2005/0257209 A1 | 11/2005 | Adams et al. | |
| 2006/0111874 A1 | 5/2006 | Curtis et al. | |
| 2006/0178954 A1 | 8/2006 | Thukral et al. | |
| 2006/0282519 A1 | 12/2006 | Trevathan et al. | |
| 2007/0061393 A1 | 3/2007 | Moore | |
| 2008/0104532 A1 | 5/2008 | Stambaugh | |
| 2008/0183626 A1 | 7/2008 | Romero et al. | |
| 2008/0243921 A1 | 10/2008 | Ellisor | |
| 2008/0244091 A1 | 10/2008 | Moore et al. | |
| 2008/0320486 A1 | 12/2008 | Bose et al. | |
| 2009/0031286 A1 | 1/2009 | Yee et al. | |
| 2009/0063559 A1 | 3/2009 | Rhodes et al. | |
| 2009/0138792 A1 | 5/2009 | Cudich et al. | |
| 2009/0249446 A1 | 10/2009 | Jenkins et al. | |
| 2009/0276771 A1 | 11/2009 | Nickolov et al. | |
| 2009/0300098 A1 | 12/2009 | Millmore et al. | |
| 2010/0268719 A1 | 10/2010 | Cormode et al. | |
| 2011/0087601 A1 | 4/2011 | Apte et al. | |
| 2011/0087604 A1 | 4/2011 | Chung et al. | |
| 2011/0154370 A1 | 6/2011 | Yu | |
| 2012/0089681 A1* | 4/2012 | Chowdhury et al. | 709/206 |
| 2013/0212170 A1* | 8/2013 | Chung et al. | 709/204 |
| 2013/0232154 A1* | 9/2013 | Hall et al. | 707/750 |

OTHER PUBLICATIONS

U.S. Appl. No. 12/973,393, filed Dec. 20, 2010, Final Office Action mailed Oct. 7, 2013, 16 pages.

U.S. Appl. No. 11/828,234, filed Jul. 25, 2007, Office Action mailed Jun. 8, 2012, 18 pages.

U.S. Appl. No. 12/576,988, filed Oct. 9, 2009, Advisory Action mailed Jun. 8, 2012, 2 pages.

U.S. Appl. No. 12/576,988, filed Oct. 9, 2009, Office Action mailed Jul. 20, 2012, 13 pages.

U.S. Appl. No. 12/973,393, filed Dec. 20, 2010, Office Action mailed Jun. 28, 2012, 13 pages.

"Asset Life Cycle Management," Provance Technologies Inc., [online], 2008, [retrieved Mar. 13, 2009]. Retrieved from: http://www.provance.com/en/Products/Asset_Life_Cycle_Management.html, 2 pages.

"Centralizing and Qualifying IT Business Data," Blazent, Inc., 2008, [retrieved Jul. 19, 2011], Retrieved from: http://web.archive.org/web/20090617000058/http://www.blazent.com/downloads/WP%20-%20IT%20Business%20Data.pdf, 12 pages.

"Peregrine Systems Introduces Asset Tracking Solution as a Foundation for Enterprise Lifecycle Asset Management," PR Newswire, [online], Sep. 21, 2004, [retrieved Mar. 13, 2009], http://www/prnewswire.com/cgi-bin/stories.pl?ACCT=104%STORY=www/story/Sep. 21, 2004-00022555428EDATE, 3 pages.

Computer Associates International, Inc., "Unicenter Asset Management Release 4.0," 2004, 6 pages.

Kaushik, P., "Micro-Blogging for Businesses: Mini Version of Blogs: Modern Tool for Creating Product Awareness," [online], Jan. 4, 2009, [Retrieved on Jul. 18, 2011]. Retrieved from: http://www.suite101.com/content/microblogging-for-businesses-a88090, 3 pages.

MacDonald, J., "Intelligent Middleware in the Realtime Enterprise," [online], Apr. 1, 2010, [retrieved on Jul. 19, 2011], Retrieved from: http://www.enterpriseirregulars.com/15799, 3 pages.

Maisami, Y., et al., "Boost Productivity and Collaboration with Enterprise Micro-Blogging," [online] Copyright 2005-2011, [retrieved on Jul. 18, 2011]. Retrieved from: http://myarticlearchive.com/articles/10/007.htm, 2 pages.

Milstein, S., "@Dell Outlet: Raising Awareness, Increasing Sales, Measuring Results," Twitter 101 for Business—A Special Guide (Print version), pp. 12-13.

Mitchell, T., et al., "Extending Altiris Inventory Solution," Dell Power Solutions, [online], May 2005, Retrieved from: http://www.dell.com/downloads/global/power/ps2q05-20050146-Altiris.pdf, 4 pages.

U.S. Appl. No. 11/828,234, filed Jul. 25, 2007, Advisory Action mailed Feb. 28, 2012, 3 pages.

U.S. Appl. No. 11/828,234, filed Jul. 25, 2007, Final Office Action mailed Dec. 21, 2011, 16 pages.

U.S. Appl. No. 11/828,234, filed Jul. 25, 2007, Office Action mailed Jun. 23, 2011, 14 pages.

U.S. Appl. No. 12/576,988, filed Oct. 9, 2009, Advisory Action mailed Aug. 5, 2011, 3 pages.

U.S. Appl. No. 12/576,988, filed Oct. 9, 2009, Final Office Action mailed Mar. 2, 2012, 13 pages.

U.S. Appl. No. 12/576,988, filed Oct. 9, 2009, Final Office Action mailed May 11, 2011, 15 pages.

U.S. Appl. No. 12/576,988, filed Oct. 9, 2009, Office Action mailed Sep. 2, 2011, 13 pages.

U.S. Appl. No. 12/576,988, filed Oct. 9, 2009, Office Action mailed Sep. 1, 2010, 11 pages.

U.S. Appl. No. 12/973,393, filed Dec. 20, 2010, Office Action mailed Jul. 6, 2011, 14 pages.

U.S. Appl. No. 12/973,393, filed Dec. 20, 2010, Final Office Action mailed Jan. 23, 2012, 14 pages.

Laszewski, et al., "A Repository Service for Grid Workflow Components," International Conference on Autonomic and Autonomous Systems, Institute of Electrical and Electronics Engineers, 2005, 10 pages.

Trask, et al., "RIGR—A Repository Model Based Approach to Management," Workshop of the pUML-Group held together with the <<UML>> 2001 on Practical UML-Based Rigorous Development Methods—Countering or Integrating the eXtremists, Oct. 1, 2001, pp. 258-269.

U.S. Appl. No. 11/828,234, filed Jul. 25, 2007, Notice of Allowance mailed Nov. 23, 2012, 8 pages.

* cited by examiner

QUANTIFY AND MEASURE MICRO-BLOGGING FOR ENTERPRISE RESOURCES PLANNING (ERP)

CROSS-REFERENCE TO RELATED APPLICATIONS

This application is related to U.S. patent application Ser. No. 12/973,393, entitled Micro-Blogging for Enterprise Resources Planning (ERP), filed on Dec. 20, 2010 by Chung et al, which is incorporated by reference in its entirety for any and all purposes.

BACKGROUND OF THE INVENTION

Embodiments of the present invention relate generally to methods and systems for presenting a summary of a set of collected information and more particularly to presenting a summary based on a set of collected messages.

In the face of an emerging and changing technological environment, social networking has impacted the world of enterprise application users. This impact has caused changes in human behavior with personal usage of software and applications and as result it has impacted business application usage, and users are adapting to the technology in both their personal lives and in their professional environments. As such, use of these social networking tools and applications can be easily and seamlessly adapted and extended to end users of an ERP financial (and other) applications. While there is a way to collect asset comments and to distribute that information to interested parties, previous approaches do not provide a way to have a high-level summary of the events that take place in the organization, across a number of assets, or a number of event classifications based on this type of collected information. Hence, improved rating and ranking methods and systems are needed in the art.

SUMMARY OF THE INVENTION

Embodiments of the invention provide systems and methods for quantifying and measuring a collection of messages such as a set of micro-blog messages. According to one embodiment, a method for presenting a summary of information represented in a set of collected messages can comprise reading a plurality of messages. Each message can be related to an object associated with an enterprise application. Each of the plurality of messages can be tagged with at least one descriptive tag. Each of the plurality of messages can be categorized into one or more of a plurality of categories based on the tag associated with each of the messages and a pre-defined association of each of the categories to a tag property. Each of the plurality of categories can be quantified and weighted based on the messages in each category and as a percentage of all of the plurality of messages. Weighting each of the quantified categories can comprise applying a pre-defined weight for each category.

The quantified and weighted categories can then be assigned to a plurality of elements of a multi-dimensional matrix. An action can be determined for each of the plurality of elements of the matrix based on a predefined action associated with a weight for the quantified and weighted categories and tags and associating the determined action with the element of the matrix. The matrix with the assigned quantified and weighted categories can be presented to a user. The determined action for one of the elements of the matrix can also be presented upon a request from the user, e.g., based on a selection, mouse-over, etc. through a user interface in which the matrix is presented.

According to another embodiment, a system can comprise a processor and a memory communicatively coupled with and readable by the processor. The memory can have stored therein a sequence of instructions which, when executed by the processor, cause the processor to present a summary of information represented in a set of collected messages by reading a plurality of messages. Each message can be related to an object associated with an enterprise application. Each of the plurality of messages can be tagged with at least one descriptive tag. Each of the plurality of messages can be categorized into one or more of a plurality of categories based on the tag associated with each of the messages and a pre-defined association of each of the categories to a tag property. Each of the plurality of categories can be quantified and weighted based on the messages in each category and as a percentage of all of the plurality of messages. Weighting each of the quantified categories can comprise applying a pre-defined weight for each category. The quantified and weighted categories can then be assigned to a plurality of elements of a multi-dimensional matrix and an action can be determined for each of the plurality of elements of the matrix based on a predefined action associated with a weight for the quantified and weighted categories and tags and associating the determined action with the element of the matrix. The matrix with the assigned quantified and weighted categories can be presented to a user and the determined action for one of the elements of the matrix can be presented upon a request from the user.

According to yet another embodiment, a machine-readable memory can have stored therein a sequence of instructions which, when executed by a processor, causes the processor to present a summary of information represented in a set of collected messages by reading a plurality of messages, each message related to an object associated with an enterprise application. The messages can be tagged with at least one descriptive tag and categorized into one or more of a plurality of categories based on the tag associated with each of the messages and a pre-defined association of each of the categories to a tag property. The categories can be quantified and weighted based on the messages in each category and as a percentage of all of the plurality of messages. The quantified and weighted categories can then be assigned to a plurality of elements of a multi-dimensional matrix and an action can be determined for each of the plurality of elements of the matrix based on a predefined action associated with a weight for the quantified and weighted categories and tags and associating the determined action with the element of the matrix. The matrix with the assigned quantified and weighted categories can be presented to a user and the determined action for one of the elements of the matrix can be presented upon a request from the user.

DETAILED DESCRIPTION OF THE INVENTION

Figure 1:
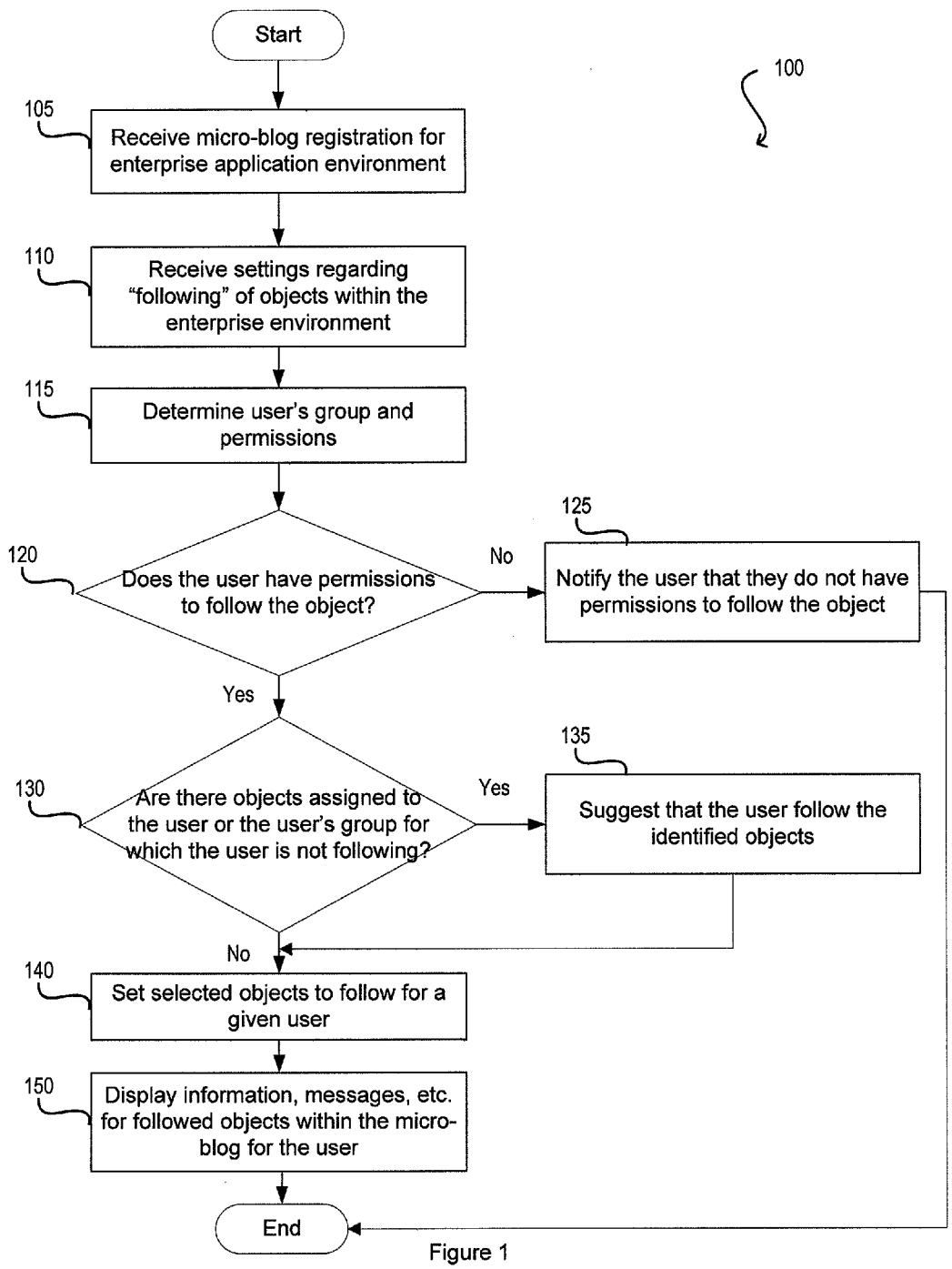
FIG. 1 is a flow diagram for implementing enterprise-based micro-blogging, in accordance with aspects of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for quantifying and measuring a collection of messages such as a set of micro-blog messages. That is, embodiments described herein can provide for presenting a quantitative view of a set of information made up a number of messages. For example, these messages can comprise emails, Short Message Service (SMS) messages, Multimedia Message Service (MMS) messages, Instant Messages, and/or any of a variety of other types of messages related to an application, process, resource, etc. of a system. A collection of such messages may be maintained in a micro-blog such as described in the Related Application cited above and entitled "Micro-Blogging for Enterprise Resources Planning (ERP)" which is incorporated herein.

Based on a micro-blog or other collection of messages, embodiments of the present invention provide for categorizing each of the messages, quantifying each category based on the messages therein, applying a weight to each of the quantified categories, plotting the weighted and quantified categories on a matrix, and presenting the matrix as a summary of the weighted and quantified categories. For example, the matrix may be presented in a dashboard, portal, or other element of a user interface of an application to which the messages are related.

For the sake of providing a complete understanding of one particular implementation of the present invention, a portion of the Related Application is reproduced here. However, it should be understood that embodiments described herein are not limited to use with a micro-blog as described therein or with an ERP or any other particular application. Rather, embodiments of the present invention are equally applicable to any collection of messages from or related to any of a variety of different types of applications.

The Related Application describes an example of micro-blogging in ERP and other enterprise application systems. As end users interact with different groups of people, for personal or business purposes, and as the end users adapt to the increasingly prevalent micro-blogging technologies, the interaction could occur via a number of devices. For example, personal computers and mobile devices which allow exchanging information in real time, such real time event information can be broadcasted and propagated immediately. Additionally, as the user becomes more proficient in interacting with systems and other users through event driven micro-blogging, aspects of the present invention will provide the business systems a similar manner of communication.

Such interaction may occur as information is changed, such as, an update (i.e., a change in assets status, etc.) of an event or in response to messages posted by one user. For example, this could be blogs posted by a user or comments entered in an ERP system (e.g., Asset Comments, etc.). Then, this information can be instantly broadcasted to the group that belong or interested group. With micro-blogging the information will be pushed out without any initiative or interaction need on part of the user, except possible for setting up which information (e.g., which IT Assets) the user desires to receive updates on. For example, the message can be considered anything that allows communicating between followers and following parties. This can contain schedule activity, or anything in the form of short texts. Such communication may be in the form of a micro-blog posting, instant message, asset comments entered in an asset management system, etc. In other words, messages and status can be exchanged automatically between applications and system hosted in servers in the case of ERP business applications.

Further aspects of the present invention utilizes micro-blogging, in the context of enterprise applications and IT asset management, to provide new concepts in tracking asset information, consolidating such information, and quickly and effectively distributing the information. End-users, across many roles, can receive information from different sources and have the information displayed in a centralized place.

Merely for the purpose of explaining and illustrating aspects of the present invention, aspects of the present invention will be illustrated with respect to IT asset information and management. However, it will be understood to one skilled in the art that the present invention can be applied to any enterprise application environment; furthermore, enterprise based micro-blogging would allow users to more effectively and efficiently leverage ERP system data and information.

For example, the present invention can receive and distribute information through multiple sources. Some such examples include SMS, Email, Instant Message, a UI available as a web page, etc. The UI may allow users to view and update status, etc. The messages can be thought of as anything that is a pertinent communication between "followers" of the IT assets. Some examples may include changes in operational status, scheduled activities, changes of users, software installation, etc.

Furthermore, since an ERP system is already designed to perform certain functionalities that involve the usage of statuses as the data travels across the transaction flow and modules, enterprise based micro-blogging is strategically placed to leverage such data. Therefore, one advantage of the enterprise based micro-blogging system is to increase efficiency by not going through the time to create reports, and additionally, it could create a better dynamism between the end user and the application to increase productivity. Accordingly, micro-blog home pages are then used in lieu of reporting because all of the events of that object are already stored in the micro-blog. Furthermore, the enterprise based micro-blog would provide more "real-time" information rather than waiting for the ERP reports to be generated.

Further, end users can select to "follow" IT assets and receive information, alerts, or messages about the followed IT asset (in lieu of the ERP reports). In one embodiment, a UI may be provided to allow end-users to select which assets they choose to follow, which creates the concept of "following", whereby a user can be thought of as tracking or "following" the status of an IT asset(s). In one such implementation, certain role users (namely software group owners) may desire to follow not only certain assets but also groups of assets. Then, as there are changes made to that group, the software group owner would receive updates about such changes. In other implementations, an end user may wish to follow the assets which they are personally assigned to or that they are authorized to use. These end-users would receive alerts and notifications for the assets (possibly after they have elected to follow them, or automatically based on their connection to the assets). Examples include being alerted when unauthorized software is found on a system, the asset changes location, when the asset is assigned to a new department, when the asset has been identified as being part of a lease that is up for renewal, etc.

In a further embodiment, updates for the assets may be displayed in a simplified page or UI which stores all the history for the communication of a given asset. This UI could also allow for the end-user to add ad-hoc comments about the asset. In one such example, prior to an office move an end-user could go to the assets that are planned to be moved and provide an ad-hoc message that the asset will be disconnected from the network for 3 days to allow for the move. Other users of the system that follow the assets, for example, a financial department manager for which those assets are assigned, would receive this ad-hoc notification and know that the assets will be off the network for a short period and possibly more importantly the reason for such absence from the network.

In the context of ERP, the UI page, blog, etc. that displays the messages, could be considered as a replacement for a traditional status history report. Further aspects of the present invention provides for a way to supplement or replace traditional reporting, in that information is automatically fed in real time which may eliminate the need to run or execute batch processes to create a report. When a user desires to see all history they can navigate to the consolidated UI. This may be part of the paradigm which shifts away from the classic reporting, whereby instant messaging and consolidated historical views (i.e., micro-blog history) can be used in lieu of a report. Therefore, there is no need to run or execute batch processes to create a report, and thus micro-blogging replaces the classic way that reporting is created and consumed in real time or as of a certain date. The consolidated UI used as a report could be, for example, a link from the users portal (i.e., a link from MyYahoo™, My Financial Dashboard, or My HR Specialist portal to the Blog UI).

Furthermore, IT assets have a lifecycle and during its usage goes through different stages and statuses. In one embodiment of the present invention, these status changes are captured by micro-blogging. For example, notifications to followers could be sent when the asset is assigned an asset tag, put into physical service, capitalized, reconciled, depreciated, etc. Further, in the context of traditional social networking micro-blogging, the asset (IT, Financial or otherwise) object can take the place of the traditional micro-blogging user of which other users would chose to follow. In one embodiment, users would follow IT assets or groups of IT assets instead of or in conjunction with following other users or user groups. For example, "status" can be considered as the messages being distributed to followers.

In a further embodiment, multiple sources for assets updates could be the location of the asset, such as from which IP Address it is connected, what discovery domain it comes from, updates from the custodian or administrator (via email, SMS or from application itself on desktop, portable devices), etc.

Aspects of the present invention provides a mechanism for simplified access to critical asset information, and will close the gap between the existing user behavior of using applications for personal use and business applications increasing the efficiency and productivity. Extensibility of the solution can significantly add value in existing ERP systems, in which the functionality of instant messaging was implemented to allow collaboration with the suppliers regarding invoice disputes. This may be particularly useful for accounts payable systems where there is no invoice dispute functionality, and as such, micro-blogs can be used to fill the gap not addressed by the ERP (Accounts Payable system). Therefore, if the invoice in dispute is chosen to be "followed" by the end user, then such existing capabilities could leverage the advantages offered from the micro-blogging functionality, such as seeing real time status updates or comments.

In another example, order management (OM), billing (BI), and account receivables (AR) systems creates transactions, such as orders, reservations, collections, etc., based on the customer information. This information may become available depending on the transaction's status which can be updated in the OM, the BI, and/or the AR. If the end user decides to follow a customer, the present invention could provide simplicity of bringing awareness of specific situations each time the followed customer information becomes updated either in the OM, the BI, and/or the AR. The simplified information would avoid the need of going through different enterprise modules, and therefore, would represent a significant saving in navigating several pages to verify the status. Following the same logic, the present invention can be an alternative more efficient solution for different functionalities already included in the current ERP system. Accordingly, micro-blogging can provide additional functionality that does not exist in the users' ERP applications by leveraging micro-blogging to fill in gaps in the ERP applications.

Furthermore, the present invention can be utilized more generally by any organization that needs to have a simplified mode to view financial information for the purpose of tracking it in real time. For example, the present invention can be applied in supply chain management (SCM) applications and implemented for customers, vendors, or human capital management (HCM) systems to apply the same concept to, for example, employee ID, providers, etc.

Turning now to FIG. 1, which illustrates a method 100 for implementing enterprise-based micro-blogging, in accordance with aspects of the present invention. At process block 105, a micro-blog registration for an enterprise application environment may be received. The registration may include an adjustment of account settings, account options, etc. The registration process may enable the user to send and receive micro-blog information within an enterprise application. In one embodiment, the enterprise application may be an ERP system, an HCM system, an SCM system, a customer information management system (i.e., OM, BI, or AR), etc. It should be noted that aspects of the present invention may be included in any number of enterprise applications and environments.

At process block 110, once the user has registered for micro-blogging, additional settings may be adjusted. For example, the user may select object or groups to "follow" within the enterprise application. In one embodiment, objects may be IT assets, clients, financial transaction, purchase orders, employees (and other human resource related objects), etc. Furthermore, "following" an object indicates that the users desired to receive micro-blog updates and information about the followed object. As such, if an IT manager is managing a laptop, then the manager would follow the laptop through the enterprise micro-blogging application, and thus receive updates and information about the laptop. The information and updated may include software that has been installed on the laptop, check-in and check-out data, failure information, etc. Accordingly, the manager following the laptop would receive real-time updates about the followed laptop.

An additional consideration regarding following objects may be the user's permissions and access level. For example, a low-level user may not be allowed to follow certain objects, such as an employee being able to follow a manager's human resource information. Alternatively, if an individual is not an IT manager, they may only be able to follow hardware and software specifically assigned to them, whereas the IT manager may have access to all hardware devices. Furthermore, a user may be restricted based on the group (i.e., IT administrators, human resources, finance, etc.) they belong to. Thus, at process block 115, a determination is made regarding the user's group and permissions.

At decision block 120, based on the permissions of the user, a determination is made whether the user is able to "follow" the selected object. If the user is unable to follow the selected object, then at process block 125, the user is notified (through the enterprise application) that they are unable to follow the selected object due to lack of proper permissions.

Alternatively, if it is determined that the user has proper permissions, then at decision block 130, a determination may be made whether the there are objects within the user's group of direct control (or management), that the user is not following. For example, the user may be an IT manager, and is thus responsible for thousands of hardware devices; however, the user may only be following five hundred of the devices. Accordingly, if it is determined that the user is not assigned to objects, then at process block 135, the user may receive suggested object which he/she should follow.

Further, the user is then set to follow any of the authorized and selected objects (process block 140). Thus, the user is now able to receive information displayed, for example, within a UI, about the objects which the user is following within the micro-blog application. Accordingly, the user received real-time updates and information for each of the followed objects, as well as the ability to submit their own updates and comments about the followed objects.

Figure 2A:
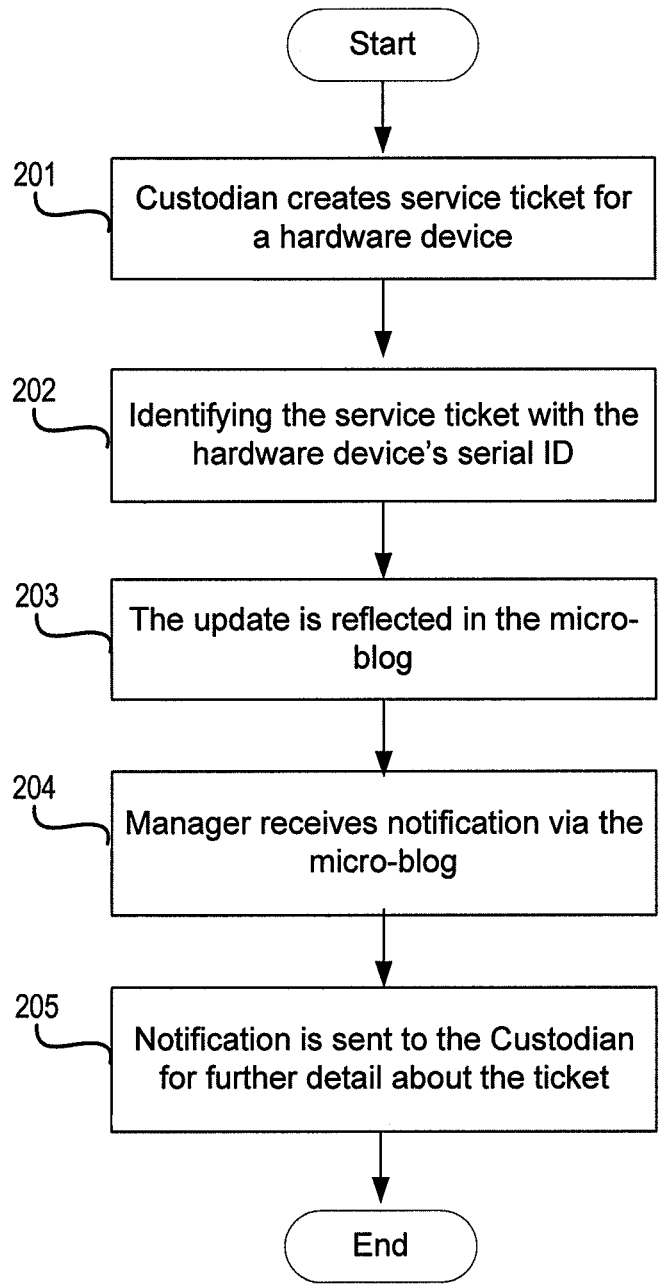
FIG. 2A is a flow diagram for implementing a method of micro-blogging for custodian hardware management, in accordance with embodiments of the present invention.

Referring next to FIG. 2A, which illustrates a method for implementing micro-blogging for custodian hardware management, in accordance with embodiments of the present invention. At process block 201, for example, a custodian of an object may create a service ticket for a hardware device (e.g., the user's monitor is malfunctioning). Thus, at process block 202, identify the service ticket with the hardware device's serial ID.

In response, the update is reflected within the micro-blog for the monitor (process block 203). The entry in the micro-blog may include the hardware ID and an attached message that the device has failed, along with possibly the custodian's name, contact number, and employee ID. Then, at process block 204, the IT manager (of the monitor), which is following the monitor because he/she is the manager for the monitor, receive notification of the ticket and the nature of the failure within the micro-blog. In one embodiment, any event that is posted to the micro-blog, can be automatic, and can also physically go into the asset to provide comments so that followers are notified of all types of events.

Accordingly, the manager may repair, replace, etc. the monitor, which would be included in the micro-blog. The custodian would then receive such notification within the micro-blog regarding the status of the monitor. Thus, this describes one example of how the enterprise-based micro-blogging may be utilized and implemented.

Figure 2B:
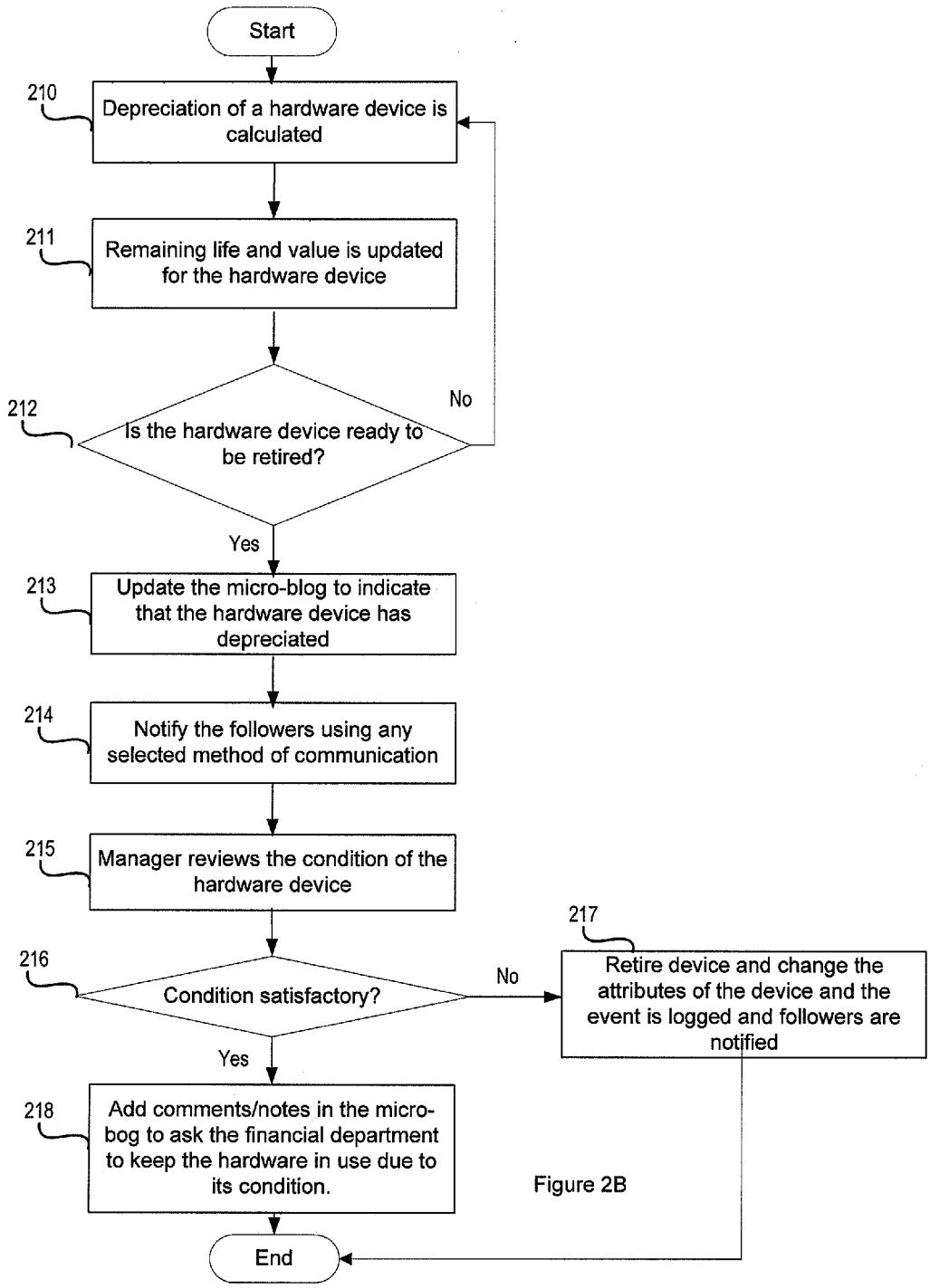
FIG. 2B is a flow diagram for implementing a method of managing hardware (and other asset) depreciation using micro-blogging, in accordance with embodiments of the present invention.

Turning next to FIG. 2B, which illustrates a method for managing hardware (and other asset) depreciation using micro-blogging, in accordance with embodiments of the present invention. At process block 210, the depreciation of a hardware device may be calculated, and the remaining life and value of the hardware device is updated within the micro-blog (process block 211). In one embodiment, the calculation of depreciation, remaining life, replacement costs, etc. may be done in the ERP system and reflected in the micro-blog. Furthermore, the micro-blogging system may perform the calculation. Alternatively, an existing ERP's module may complete the corresponding calculation, and the enterprise based micro-blogging system would be updated based on the change of status.

At decision block 212, a determination is made whether the hardware device should be retired. If it is determined that the hardware device should not be retired then depreciation determination process continues. If it is determined that the device should be retired, then at process block 213, the micro-blog is updated to reflect that the hardware device has been depreciated. Then, at process block 214, the IT manager for the device is notified via the micro-blog (again, the manger is following the device).

In one embodiment, the manager reviews the condition of the device (process block 215), the manager then makes a determination as to whether the condition is still satisfactory (decision block 216). If it is determined that the device is not satisfactory (or has depreciated sufficiently), the manager may determine that the device should be retired, as such, at process block 217, the manager may notify, for example, the financial department about the retired device via the micro-blog.

Alternatively, if the device is determined to still be in satisfactory condition, then the manager may add a comment/note in the micro-blog to request that the financial department keep the hardware in use due to the condition. In addition, the custodian may also be made aware that the device is still in use, retired, etc.

Figure 2C:
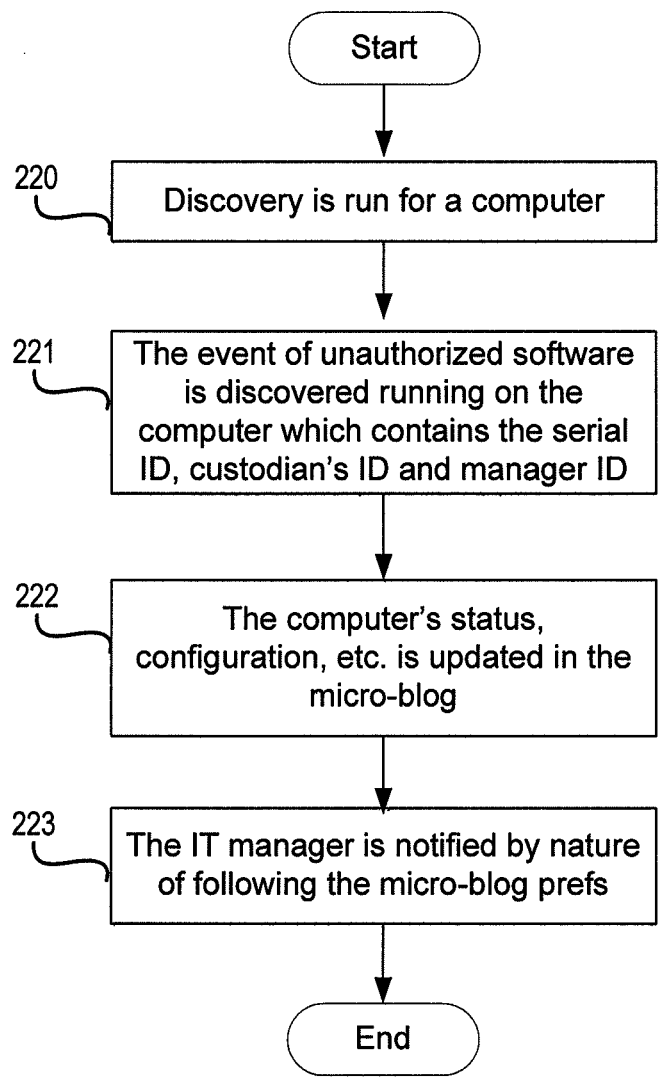
FIG. 2C is a flow diagram for implementing a method of managing software installation and usage using micro-blogging, in accordance with embodiments of the present invention.

Referring next to FIG. 2C, which illustrates a method for managing software installation and usage using micro-blogging, in accordance with embodiments of the present invention. At process block 220, discovery may be run on a computer. For example, a sweep of a computer's software may be done to check for unauthorized or unlicensed software. At process block 221, any unauthorized software is discovered running on the computer.

At process block 222, the computer's status, configuration, etc. is updated in the micro-blog. As such, the IT manager (or authorized follower) may then be notified of the offending software and computer via the micro-blog, and any necessary actions can then be taken (process block 223).

Figure 2D:
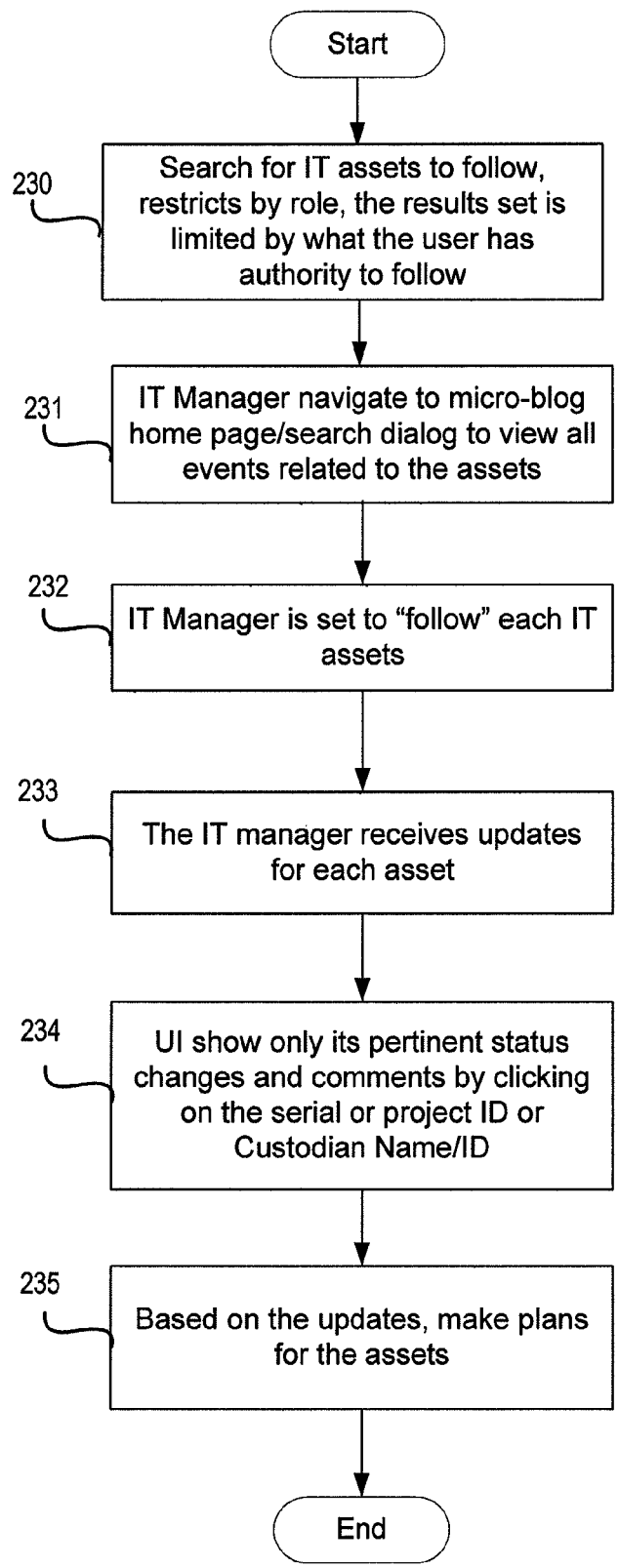
FIG. 2D is a flow diagram for implementing a method of implementing micro-blogging for IT managers, in accordance with embodiments of the present invention.

Referring now to FIG. 2D, which illustrates a method for implementing micro-blogging for IT managers, in accordance with embodiments of the present invention. At process block 230, IT assets may be searched to determine which assets to "follow". In one embodiment, the result set may be restricted by role, and only the assets for which the user has authority to follow are displayed. At process block 231, an IT manager is able to navigate to a micro-blog home page, or similar UI. The IT manager is set to follow each IT asset (process block 232). At process block 233, the IT manager then receives updates and information about each asset via the micro-blog. In one embodiment, the UI may show pertinent status changes and comments by clicking on the serial ID or project ID, or even the custodian name/ID (process block 234). As such, based on the updates the IT manager is able to make plans for each of the IT assets that they manage (process block 325).

Figure 2E:
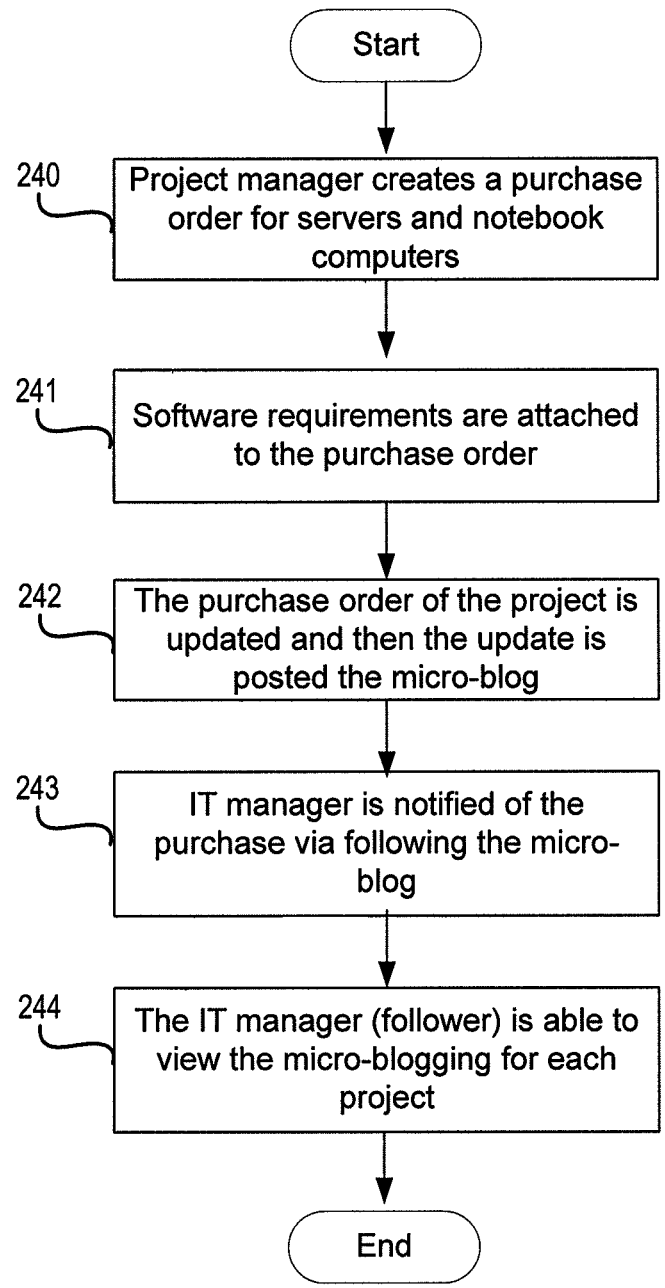
FIG. 2E is a flow diagram for implementing a method of purchase order management using micro-blogging, in accordance with embodiments of the present invention.

FIG. 2E illustrates a method for purchase order management using micro-blogging, in accordance with embodiments of the present invention. At process block 240, a purchase order may be created by a project manager for an order of, for example, servers and notebooks. In one embodiment, the purchase order information may be posted on the micro-blog, and as such anyone following the purchase order may then be notified of the updates to the purchase order.

At process block 241, software requirements may also be attached to the purchase order, and such information may also be distributed via the micro-blog. Accordingly, the purchase order, project name, etc. are updated on the micro-blog and all of the followers receive the updated information (process block 242). At process block 243, the IT manager (or follower) may be notified of the purchase, also via the micro-blog. Then, at process block 244, the IT manager (or follower) is able to view and comment on the project and purchase order via the micro-blog.

Figure 3:
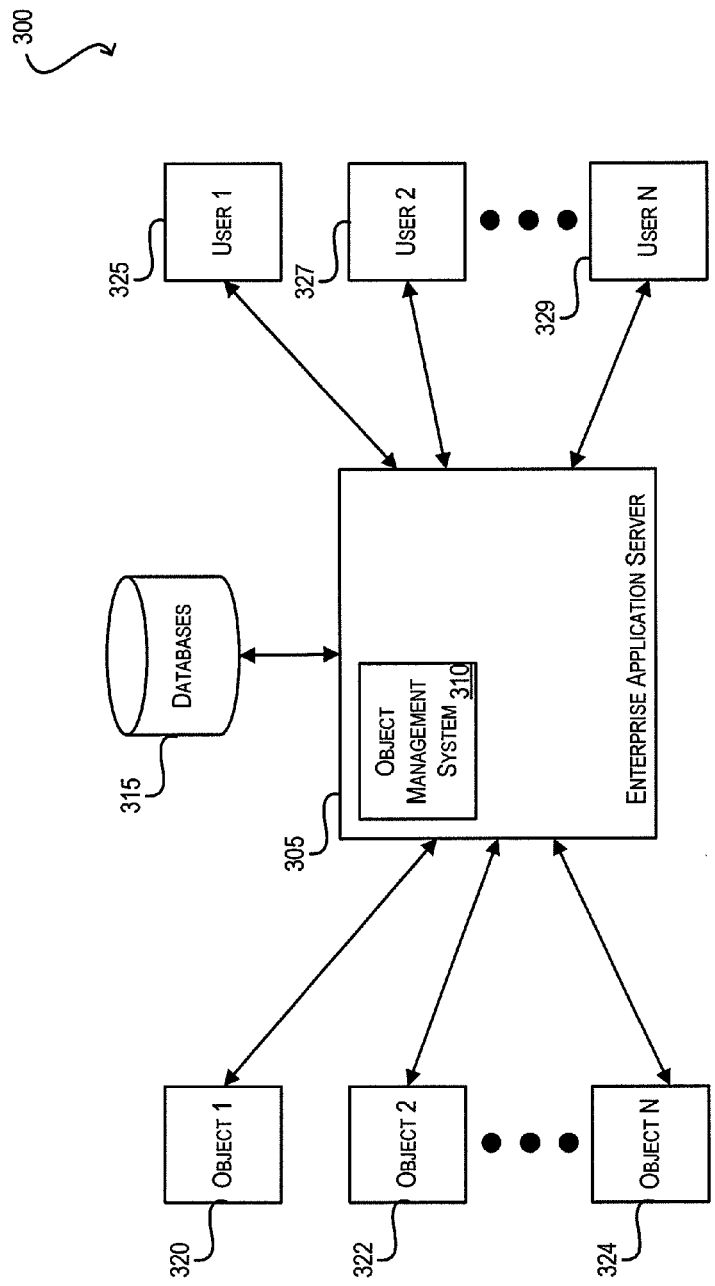
FIG. 3 is a block diagram for implementing a system for implementing enterprise-based micro-blogging, in accordance with aspects of the present invention.

Turning now to FIG. 3, which illustrates a system 300 for implementing enterprise-based micro-blogging, in accordance with aspects of the present invention. In one embodiment, system 300 includes an enterprise application server 305, which also includes an object management system 310. The enterprise application server may run any number of enterprise applications, for example, an ERP system, an HCM system, an SCM system, a customer information management system (i.e., OM, BI, or AR), etc.

In one embodiment, the object management system 310 may be configured to manage information, updates, comments, etc. about objects within the enterprise application. The object management system 310 may also be configured to implement a micro-blog for objects associated with the enterprise application (i.e., object 1 320, object 2 322, and object N 324). Furthermore, users 1 325, 1 327, and N 329 may be followers of any one of objects 320, 322, or 324. As such, as comments, updates, changes, etc. occur with regard to any one of the objects, the object management system 310 may then process the information and post it to the following users of the corresponding object. Accordingly, the users 325, 327, and 329 are able to receive real-time updates about the objects. Furthermore, system 300 may be used to implement any one of the methods described in FIG. 1 or 2A-2E.

Figure 4A:
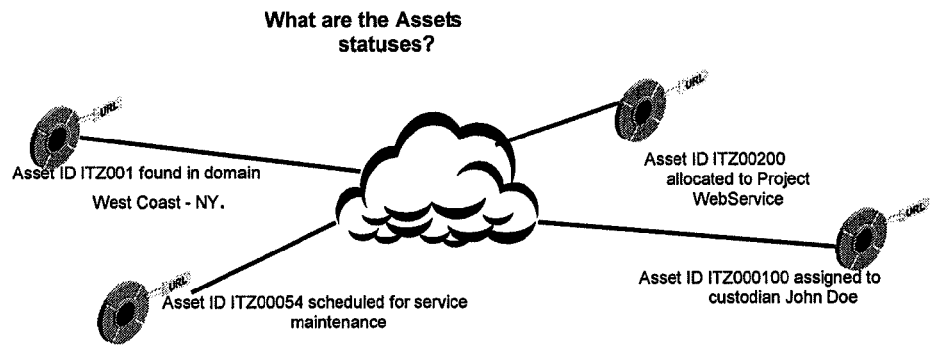
FIGS. 4A and 4B are graphical user interfaces (UIs) of ERP micro-blogging, in accordance with embodiments of the present invention.
Figure 4B:
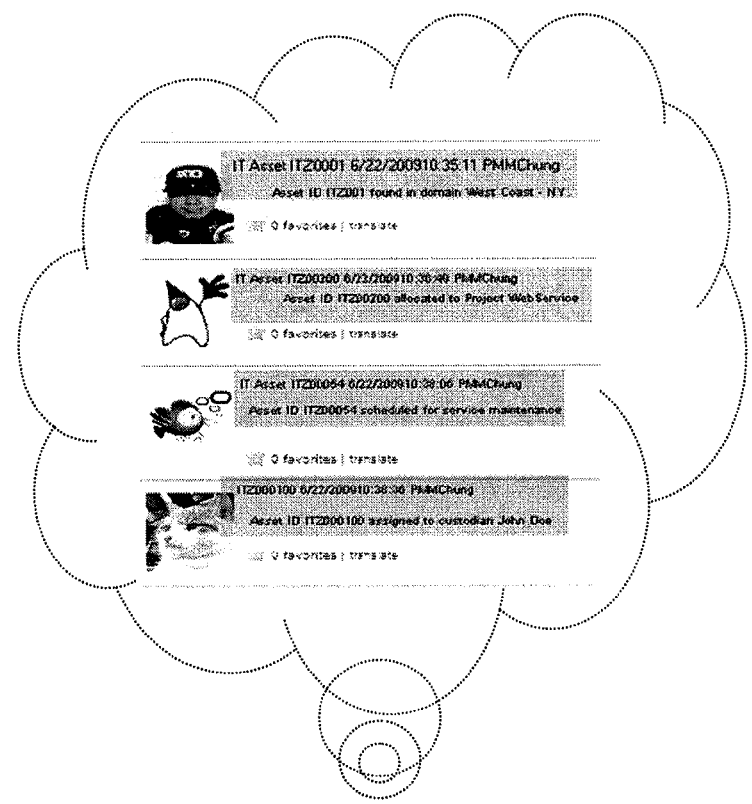

Using the graphical interface of FIGS. 4A and 4B, end users may register to the micro-blog feature. The end users may also set "follow" to an asset, project, employee, employee group, etc. Then, the selected assets, projects, employees, employee group, set to follow are changed to "following" for the user. These objects will then be displayed in each registered user's page(s). The registered user will now be displayed activities related to the objects that are set to follow. In one embodiment, FIG. 4 displays to the user "tweets" from non-humans (i.e., system generated notifications). As such, this provides a history of all of the objects that a user is following.

A number of possible status messages may be displayed within the UI. For example, Table 1 describes various possible status messages:

TABLE 1

- Added to Asset Management System
- Replaced
- Replacement part ordered
- Service ticket created for the asset
- Scheduled for maintenance service
- Retired
- Depreciated
- Retired Not In Use
- Retired In Use
- In Physical Use/Not In Physical Use
- Custodian Change
- Manger of the custodian change
- Transferred to different Business Unit (BU)
- Transferred to different Inventory Warehouse
- Custodian/User of Hardware (HW) has added review/comments.
- New IP address
- Track IP Address from which the HW has connected
- Authorized Software Title is installed in HW MAC Address
- Unauthorized Installation of Software (SW) in HW MAC Address
- Unauthorized user of HW
- Custodian differ from authorized user
- Maintenance Date is in xx days.
- HW with unauthorized SW discovered and not in Asset Management System
- HW in Asset Management System but not in Discovery
- HW has PO requisition ID associated and added to Asset Management System
- HW has PO requisition ID associated for purchase accessory
- HW's PO Requisition Approval/Not Approved
- Financial Asset became Non Financial Asset
- Non Financial Asset is Not in Use
- Asset appeared in Asset Not Reporting list
- Asset is listed in Manage Exception List
- Asset has ignored action applied from Manage Exception
- To be defined more based on the implementation of ERP, HCM, CRM, SCM.

However, an end user who has implemented micro-blogging may lack a practical tool or option to have an overall sense of all of activities that are constantly being fed into the micro-blog. Considering that the blog messages are text based they are not easy to search or quantify into a meaningful factor to help identify areas of greater concern for an organization. For example, a computer may have had many events recorded against it in the form of micro-blogging. A specific example might be software assets being loaded on to the machine post requisition or after rebuild. These events by themselves may not warrant any investigation. However, if the count of these messages across a machine or particular software asset are very high, as a total across the organization, then this may be reason for more investigation.

Embodiments of the present invention provide an option to the end user to have one view of the activities generated in the system and initiate a proactive response to issues occurring in aggregate. The option can help the end user to have a sense, at high level, of the micro-blogged statuses generated internally by the system or user ad-hoc. Embodiments provide a graph based on quadrants that can show dots (or any other accurate shape of graphic). The point can have a coordinate from the relationship between the quantity of status and a weight. Once having the result of relationship between levels and the quantity of the Micro-Blogged status, the graph can reflect the point drawn dynamically in different quadrants depending on the value of the coordinate. Embodiments can also provide a first approach and allow the user to take certain actions as needed and supplement it later with complex measuring systems.

Stated another way, embodiments of the invention provide systems and methods for quantifying and measuring a collection of messages such as a set of micro-blog messages as described above. That is, embodiments described herein can provide for presenting a quantitative view of a set of information made up of a number of messages. Based on a micro-blog or other collection of messages, embodiments of the present invention provide for categorizing each of the messages, quantifying each category based on the messages therein, applying a weight to each of the quantified categories, plotting the weighted and quantified categories on a matrix, and presenting the matrix as a summary of the weighted and quantified categories. For example, the matrix may be presented in a dashboard, portal, or other element of a user interface of an application to which the messages are related.

Figure 5:
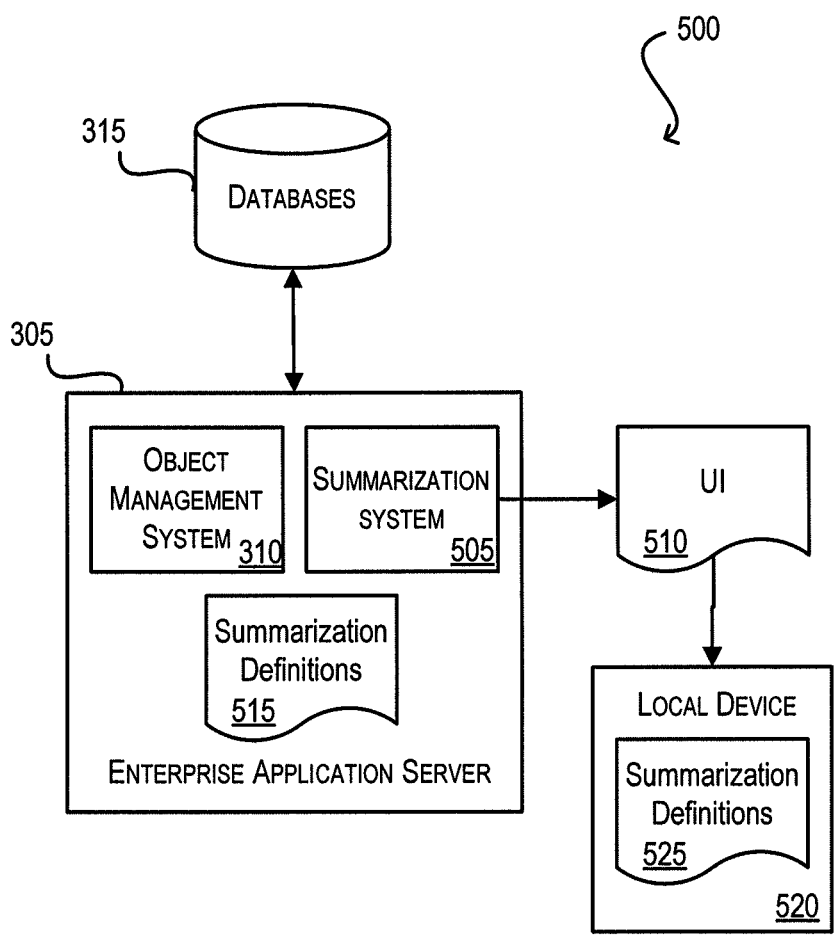
FIG. 5 is a block diagram illustrating an exemplary system for implementation of quantifying and measuring of micro-blog messages according to one embodiment of the present invention.

FIG. 5 is a block diagram illustrating an exemplary system for implementation of quantifying and measuring of micro-blog messages according to one embodiment of the present invention. In this example, the system 500 includes an enterprise application server 305, which also includes an object management system 310 such as described above. The system 500 can also include a database 315 in which may be stored any number of micro-blogging or other messages. For example, an application such as the object management system 310 or any other application (not shown here) executing on or in communication with the enterprise application server 305 and/or the database 315 can generate a message as described herein to be saved in the database 315 as part of a micro-blog.

According to one embodiment, the enterprise application server 305 can also include a summarization system 505. Generally speaking, the summarization system 505 can read the messages of the micro-blog from the database 315 and generate a user interface 510 including a representation summarizing the contents of the messages. For example, the representation of the user interface 510 can comprise a graph or chart such as will be described below with reference to FIG. 6 which can graphically represent a distribution of the different types of messages of the micro-blog but also with the different types, contents, etc. weighted based on a set of pre-defined summary definitions 515. According to one embodiment, the user interface 510 can be provided to a local device 520 for presentation to a user thereof. In some cases, the local device 520 can comprise a personal computer or a mobile device such as cell phone, tablet, etc. In such cases, the summarization definitions 525 may be stored locally on the local device 520 instead of or in addition to those 515 stored on the enterprise server 305 and used by the local device 520 when rendering the user interface 510.

Stated another way, presenting by the summarization system 505 a summary of information represented in a set of collected messages can comprise reading a plurality of messages from the database 315. Each message can be related to an object associated with an enterprise application such as the object management system 310 or any other application (not shown here executed by or in communication with the enterprise application server 305 and/or the database 315. Each of the plurality of messages can be categorized by the summarization system 505 into one or more of a plurality of categories. For example, categorizing each of the plurality of messages into one or more of a plurality of categories can be based on a tag associated with each of the messages and a pre-defined association of each of the categories to a tag property such as a name, a value, a condition, etc. from the summarization definitions 515. Each of the plurality of categories can then be quantified by the summarization system 505 based on the messages in each category and as a percentage of all of the plurality of messages. In other words, the quantity for a particular category can be the percentage of the total number of messages that are assigned to the category. Each of the quantified categories can then be weighted by the summarization system 505. For example, weighting each of the quantified categories can comprise applying a predefined weight value to the quantity for each category from the summarization definitions 515.

The quantified and weighted categories can also be assigned by the summarization system 505 to a plurality of elements of a multi-dimensional matrix such as, for example, the chart described below with reference to FIG. 6. In some cases, an action can be determined by the summarization system 505 for each of the plurality of elements of the matrix, or some subset thereof. The action can be determined based on a predefined action associated in the summarization definitions 515 with a weight for the quantified and weighted categories and associating the determined action with the element of the matrix. For example, the actions can comprise an automatic action such as a notification that is triggered and sent to one or more entities. The matrix with the assigned quantified and weighted categories can be presented by the summarization system 505 in a user interface 510 to a user. For example, presenting the matrix can comprise displaying a chart such as described below with reference to FIG. 6 in a dashboard, portal, or other element of the user interface 510 of an application for which the messages have been generated or used. Presenting the matrix can also include presenting the determined action for one of the elements of the matrix upon a request from the user. That is, the determined actions may also include manual actions such as a notification or instructions to be displayed to a user when the user clicks, hovers, or otherwise manipulates the user interface to select one of the elements of the matrix.

Tags can be assigned by the user or auto-assigned by the system. For example, if an asset is transferred from one department to another, the new department could be automatically added as a tag. In other examples, if the system were creating a micro-blog for an unauthorized user of software it may auto-assign tags of Software, Unauthorized, Microsoft (for vendor). If somebody in Finance saw the micro-blog and was working on an audit of Microsoft Office, they could add a tag of Audit and Q4. To indicate this is the $4^{th}$ quarter audit. Other examples of tags could be Hardware, Lease, Finance, Depreciated, Rebuild, Project names, Manufacturers, Department Names or IDs.

According to one embodiment, categories can be tagged during a predefined process. Messages can be tagged automatically (via predefinition) and manually from user's UI or while manually creating message by the user. Each tag label can comprise messages counted under the same label that includes messages within a category or more than one category. The matrix can contemplate the counting depending on the user preference to include or not counting under format of tags labels. So, by way of example and not limitation, categories can be assigned based on a source of the message like type of application, source of network by region, by amount of transaction in General Ledger or Billing or Account Payables, etc. In another example, categories can be assigned by type of objects, e.g., in case Billing invoice, by invoice number from xyz to zyx, or invoice type like Credit, Debit or dispute; in case of AP, vendor dispute type; in case of HCM, by employee vacation days; etc. It should be understood that other possible approaches to categorizing and/or tagging of messages are contemplated and considered to be within the scope of the present invention.

Figure 6A:
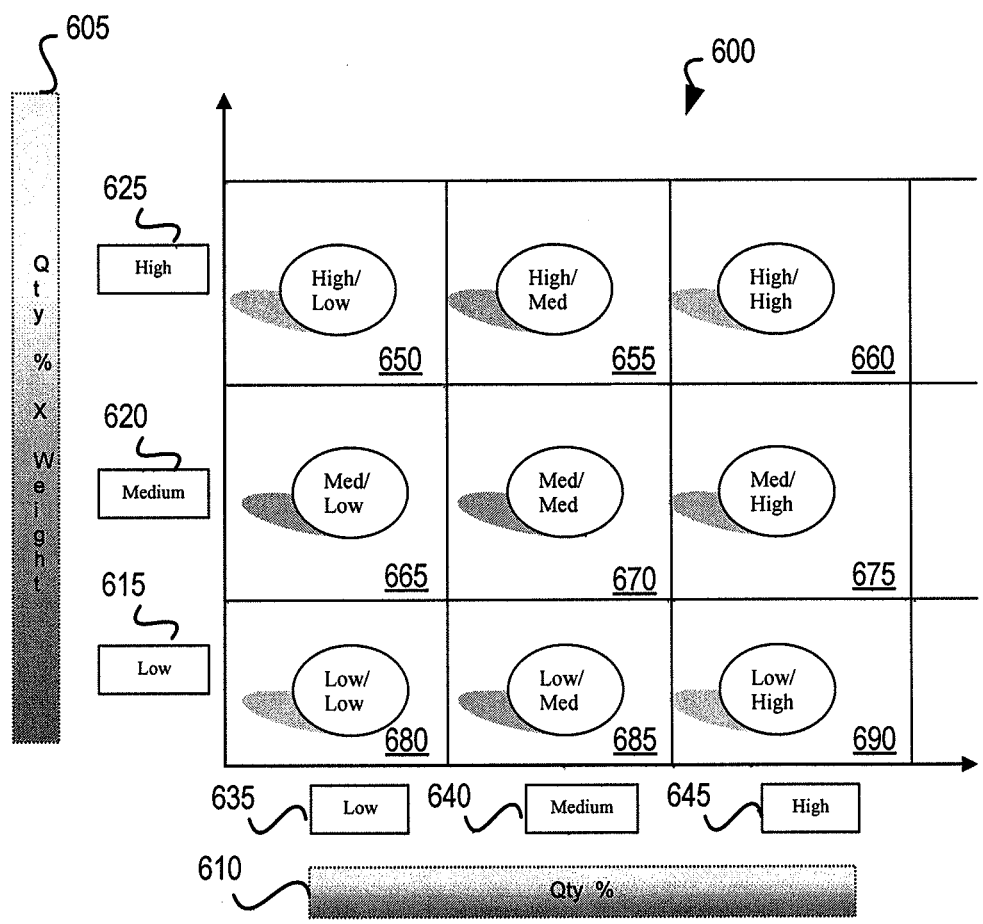
FIGS. 6A and 6B illustrate examples of a matrix for plotting quantified and weighted categories of messages according to embodiments of the present invention.

FIG. 6A illustrates an exemplary matrix for plotting quantified and weighted categories of messages according to one embodiment of the present invention. In this example, a chart 600 is used to represent a distribution of the categorized and weighted messages. Here, the chart 600 is shown as a two-dimensional matrix including a horizontal axis 610 representing a quantity (as a percent of total) of each particular category of messages and a vertical axis 605 representing a weighting of each category. Also as illustrated in this example, the horizontal axis 610 can be divided into a number of regions or columns 635, 640, and 645 representing the different categories. Similarly, the vertical axis 605 can be divided into a number of regions or rows 615, 620, and 625 representing the different ranges of weightings. Thus, the chart 600 also includes a set of matrix elements 650, 655, 660, 665, 670, 675, 680, 685, and 690 corresponding to each quantified category 635, 640, and 645 of the horizontal axis 610 and each weight range 615, 620, and 625 represented on the vertical axis 605. It should be noted that, while represented here as a two-dimensional chart 600 comprising a 3×3 matrix, this particular arrangement is provided as an exemplary implementation only and should not be considered limiting on the scope of the present invention. Rather, other arrangements are possible and contemplated depending upon the implementation and as defined in summary definitions of a particular application. For example, different numbers and types of categories, different numbers of weight ranges, different arrangements of the axis, and even additional dimensions are contemplated and considered to be within the scope of the present invention.

Figure 6B:
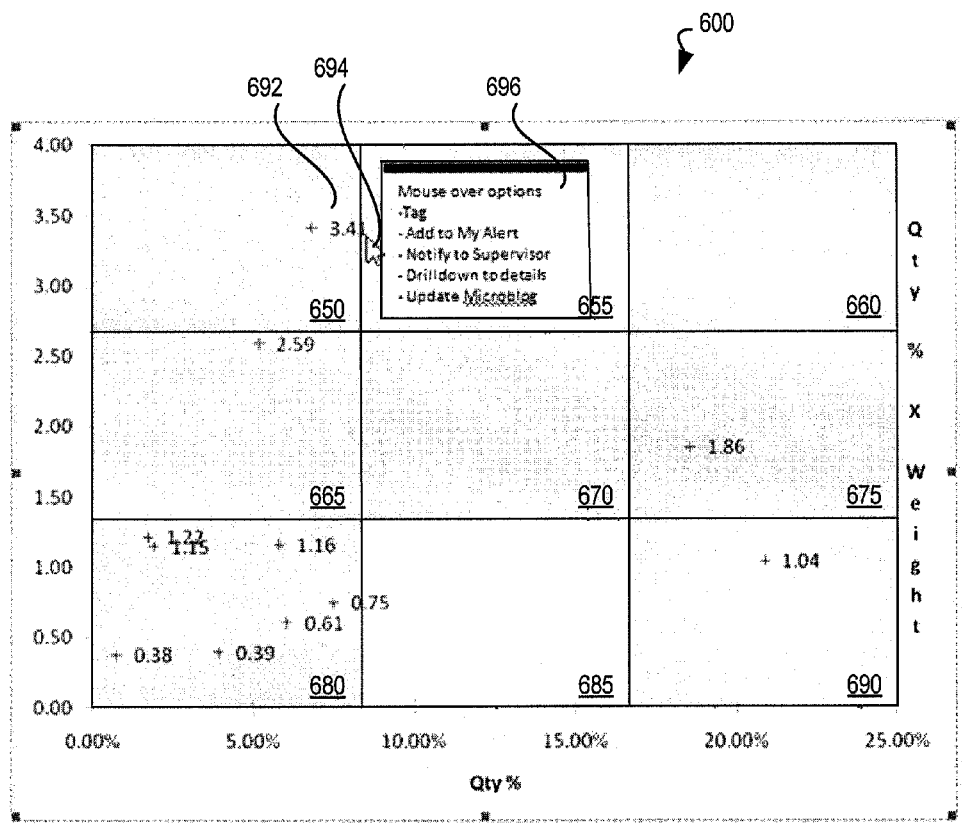

FIG. 6B illustrates an exemplary matrix for plotting quantified and weighted categories of messages according to one embodiment of the present invention. In this example, the chart 600 is used to represent a distribution of the categorized and weighted messages as described above including a set of matrix elements 650, 655, 660, 665, 670, 675, 680, 685, and 690 corresponding to each quantified category of the horizontal axis and each weight range represented on the vertical axis. Individual messages can be represented as points plotted on the chart with an indication of the weighted value, e.g., point 692. According to one embodiment, a user may manipulate the user interface, e.g., by moving a mouse to cause a cursor 694, to hover over or otherwise select the point 692. Upon this selection, additional information of the message may be displayed, for example in a popup or hover layer window or box 696. This additional information can include but is not limited to option, e.g., links etc., to tag the message, add an alert, send a notification, drilldown to details of the message, update the micro-blog, etc., These options can also be contextual and configured with the setup of the tags/categories or positions of the matrix. For example, if the micro-blog was tagged finance, then a route to Financial supervisor could be a mouseover. If the tag was software, then a route to Software Compliance Officer, could be an option, similarly, Payables Clerk for AP issues, etc.

Regardless of the exact arrangement, embodiments provide a graph that can be based on quadrants or elements that can, for example, show dots (or any other accurate shape of graphic not shown here). Each point can have a coordinate from the relationship between the quantity of status and a weight. Having the result of relationship between levels and the quantity of the micro-blogged status, the graph can reflect points drawn dynamically in different quadrants depending on the value of the coordinate. Embodiments can also provide a description of a first approach and allow the user to take certain actions as needed and supplement it later with complex measuring systems.

According to one embodiment, each quadrant or element 650, 655, 660, 665, 670, 675, 680, 685, and 690 of the chart 600 can give a meaning and importance. Additionally, upon a mouse over the quadrant, several actions can be made available allowing drill down to the source and send notifications to respective parties of interest. Table 1 contains an example of a color code and type of severity that can be applied to the elements 650, 655, 660, 665, 670, 675, 680, 685, and 690 of the chart 600 as well as some exemplary actions.

As noted above, these categories, ranges, weights, actions, etc. can be pre-defined for a particular implementations. For example, the end user can populate set-up or configuration data such as a weight (e.g., from 0 to 100) the tag for each

TABLE 1

| Levels | Color Code for graphical explanation purpose only | Importance/Meaning (will vary little bit depending on source and application) | Actions |
| --- | --- | --- | --- |
| Low/Low 680 | White | Lowest levels of statuses have been micro-blogged. Depending on the source of application type, this will require special attention, or in case of CRM application, this could mean good performance or quality of product. | Automatic Actions: Add tag of Importance in the respective categories with Date/Timestamp + Color Code (in color or color value) Manual Actions: Upon Mouse over the quadrant list category names and values and allow drill down From respective quadrants, allow to send emails/tweet directly to each department's owners. Add tag |
| Low/Med 685 Med/Low 665 | Yellow | Expected or acceptable levels of statuses have been micro-blogged that provide a healthy level. | Same actions for level Low/Low |
| High/Low 650 High/Med 655 Low/High 690 Med/High 675 | Orange | Relatively high volumes of statuses have been Micro-Blogged that will require attention but not critical. | Automatic Actions: Notification: trigger sms/email/tweet to Supervisors/Managers Add tag of High Importance in the respective categories with Date/Timestamp + Color Code (in color or color value) Manual Actions: Upon Mouse over the quadrant list category names and values and allow drill down From respective quadrants, allow to send emails/tweet directly to each department's owners. Add tag |
| Med/Med 670 | Green | Most acceptable level of activities or interpret it as the midpoint of acceptance depending on the source of apps. | Same actions for level Low/Low |
| High/High 660 | Red | High volumes of statuses have been Micro-Blogged that would require special attention and need for investigation. | Automatic Actions: Notification: trigger sms/email/tweet to Managers/Directors Add tag of High Importance in the respective categories with Date/Timestamp + Color Code (in color or color value) Manual Actions: Upon Mouse over the quadrant list category names and values and allow drill down From respective quadrants, allow to send emails/tweet directly to each department's owners. Add tag | category of a micro-blog set, and an association between the weight and the tag.

Embodiments of the present invention can also provide an option to the end user with functionality to get systematic alerts for unexpected behavior created within the application with a sense of the quantity of status created internally by the system. Such alert can allow the end user to visualize the amount of messages created within the system as either expected or unexpected. If it were unexpected, the end user can have an option to investigate and take action as needed. So for example, based on ranges of priorities setup by the end user, the user can get notified when the quantity of status are within certain parameters set by end user and based on the weight, the end user can initiate further investigation and apply the similar set of actions.

More specifically, the user can, for example, set parameters of a category/group that can be used to classify different status, and then assign a weight to each category/group. The user can also assign to these weights a set of actions. These actions can include automatic actions including but not limited to triggering a notification such as an sms/email/tweet to certain persons, e.g., Supervisor/Managers/Directors, and/or adding a tag of "High Importance" in the respective categories with a Date/Timestamp+Value of Weight. The actions can additionally or alternatively comprise manual actions. Manual actions can include but are not limited to: upon a mouse-over of the quadrant list category names and values and allow drill down; from respective quadrants, allow the user to send emails/tweet directly to each department's owners; allow the user to add a tag; etc.

To further illustrate an embodiment of the present invention, an example of one implementation will be described with reference to an ERP application's IT Asset Management (ITAM) functionality. In this example, the categories and status outlined above can be defined in one example as shown in Table 2.

TABLE 2

Setting Category/Status/Rank for ERP ITAM:

| Category/#Tag | Status | Weight |
| --- | --- | --- |
| H/W Connectivity Update #HW | IP Address Change New IP Address | 1, 2, 3, 4, 5 |
| Custodian #Custodian | User of H/W Change of custodian Reporting Manager change | 1, 2, 3, 4, 5 |
| Asset Retire #AssetRetire | H/W Retired Replaced with other H/W | 1, 2, 3, 4, 5 |
| S/W License #SW | Expired License in H/W Serial ###### S/W License not found in ARM | 1, 2, 3, 4, 5 |
| Physical Use #PhysicalUse | Non Physical Use Physical Use of retired HW | 1, 2, 3, 4, 5 |
| Maintenance #Maint | Scheduled for Maintenance Replacement part ordered | 1, 2, 3, 4, 5 |

Each rank can then be associated with different levels of alert via a threshold of messages by period that can be weekly, bi-weekly, monthly, and daily as illustrated, for example, in Table 3.

TABLE 3

Setting Threshold limit for status and weight

| Period | Priority | Threshold Limit for variable "C". | Level of Alert | Actions Manual | Automatic |
| --- | --- | --- | --- | --- | --- |
| 30 Days | 3 | <1000 | ! | Add Tag/Tweet | Add tag with Weight associated with Date/Time |
|  | 5 | 1001< >2000 | !! | Add Tag/Tweet | Add tag with Weight associated with Date/Time |
|  | 1 | >2001 | !!! | Email/SMS/Tweet/ Add Tag | Tweet |
|  | 3 | <1000 | ! | Add Tag/Tweet | Add tag with Weight associated with Date/Time |
|  | 5 | 1001< >2000 | !! | Add Tag/Tweet | Add tag with Weight associated with Date/Time |
|  | 1 | >2001 | !!! | Email/SMS/Tweet/ Add Tag | Tweet |
|  | 3 | <1000 | ! | Add Tag/Tweet | Add tag with Weight associated with Date/Time |
|  | 5 | 1001< >2000 | !! | Add Tag/Tweet | Add tag with Weight associated with Date/Time |
|  | 1 | >2001 | !!! | Email/SMS/Tweet/ Add Tag | Tweet |

TABLE 3-continued

| | | | | |
|---|---|---|---|---|
| 3 | <1000 | ! | Add Tag/Tweet | Add tag with Weight associated with Date/Time |
| 5 | 1001< >2000 | !! | Add Tag/Tweet | Add tag with Weight associated with Date/Time |
| 1 | >2001 | !!! | Email/SMS/Tweet/ Add Tag | Tweet |
| 3 | <1000 | ! | Add Tag/Tweet | Add tag with Weight associated with Date/Time |
| 5 | 1001< >2000 | !! | Add Tag/Tweet | Add tag with Weight associated with Date/Time |
| 1 | >2001 | !!! | Email/SMS/Tweet/ Add Tag | Tweet |
| 3 | <1000 | ! | Add Tag/Tweet | Add tag with Weight associated with Date/Time |
| 5 | 1001< >2000 | !! | Add Tag/Tweet | Add tag with Weight associated with Date/Time |
| 1 | >2001 | !!! | Email/SMS/Tweet/ Add Tag | Tweet |

The "Level of Alert" symbol can be presented with the alert or, in some cases, could be in color instead such as "!"=Green, "!!"=Yellow, and "!!!"=Red which can be used, for example, to color a quadrant of the chart etc. The rank can be more granular when the category contains sub levels. Therefore, it can give, at a glance, the importance of each category, and also where to review first and take action as needed. The output can be similar to that illustrated in Table 4.

TABLE 4

Setting Level of Alert

| Category | Status | Rank | Alert |
|---|---|---|---|
| H/W Connectivity Update (100) | IP Address Change (85) New IP Address (15) | A | ! |
| Custodian (1111) | User of H/W (300) Change of custodian (611) Reporting Manager change (20) | B | !!! |
| Asset Retire (2000) | H/W Retired (1500) Replaced with other H/W (500) | C | ! |
| S/W License (3000) | Expired License in H/W Serial ###### (2000) S/W License not found in ARM (1000) | D | ! |
| Physical Use (100) | Non Physical Use (15) Physical Use of retired HW (85) | E | ! |
| Maintenance (5000) | Scheduled for Maintenance (3000) Replacement part ordered (2000) | F | ! |

Numbers between ( ) can represent the quantity of status entered in the micro-blog for ERP. In addition, the awareness can bring up attention for custodian category after noticing that there have been changes of status of Custodian about 611, which represent more than expected for the period of month.

Figure 7:
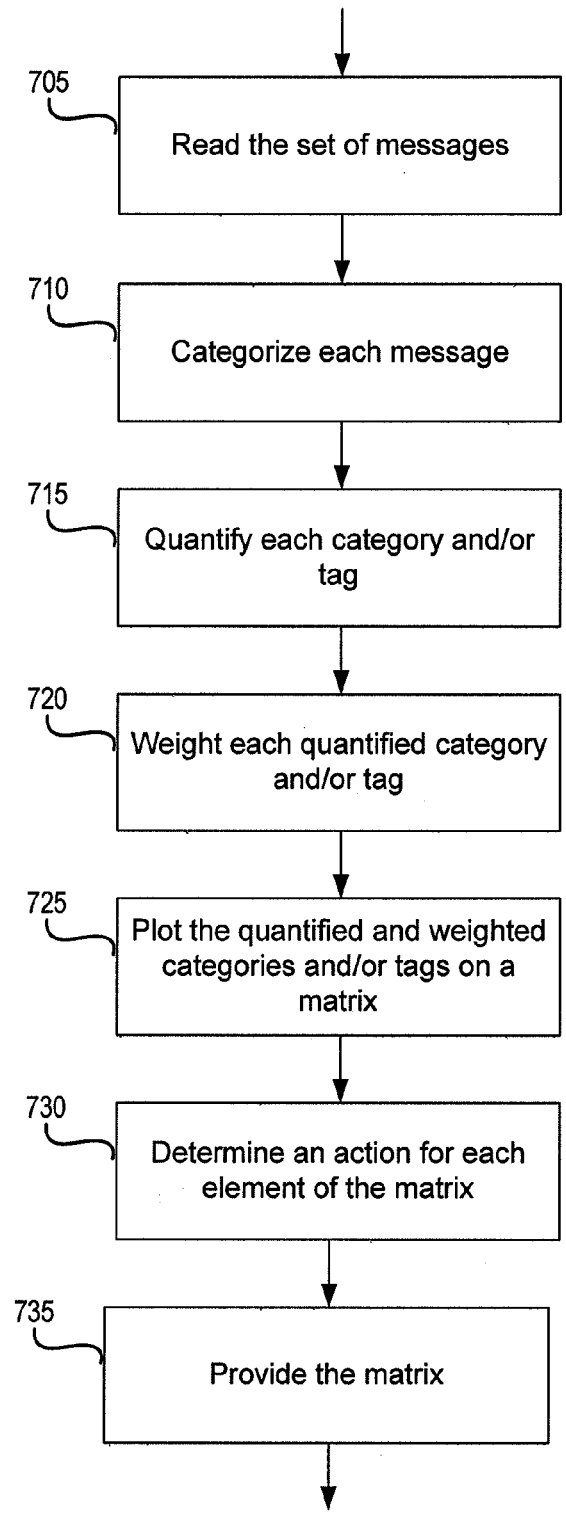
FIG. 7 is a flowchart illustrating an exemplary process for quantifying and measuring of micro-blog messages according to one embodiment of the present invention.

FIG. 7 is a flowchart illustrating an exemplary process for quantifying and measuring of micro-blog messages according to one embodiment of the present invention. In this example, presenting a summary of information represented in a set of collected messages can comprise reading 705 a plurality of messages. Each message can be related to an object associated with an enterprise application such as described above. Each of the plurality of messages can be categorized 710 into one or more of a plurality of categories. For example, categorizing 710 each of the plurality of messages into one or more of a plurality of categories can be based on a tag associated with each of the messages and a pre-defined association of each of the categories to a tag property such as a name, a value, a condition, etc. Each of the plurality of categories can then be quantified 715 based on the messages in each category and as a percentage of all of the plurality of messages. In other words, the quantity for a particular category can be the percentage of the total number of messages that are assigned to the category. Each of the quantified categories can then be weighted 720. For example, weighting 720 each of the quantified categories can comprise applying a predefined weight value to the quantity for each category.

The quantified and weighted categories can also be assigned 725 to a plurality of elements of a multi-dimensional matrix such as, for example, the chart described above with reference to FIG. 6. In some cases, an action can be determined 730 for each of the plurality of elements of the matrix, or some subset thereof. The action can be determined 730 based on a predefined action associated with a weight for the quantified and weighted categories and associating the determined action with the element of the matrix. For example, the actions can comprise an automatic action such as a notification that is triggered and sent to one or more entities. The matrix with the assigned quantified and weighted categories can be presented 735 to a user. For example, presenting 735 the matrix can comprise displaying a chart such as described above with reference to FIG. 6 in a dashboard, portal, or other element of a user interface of an application for which the messages have been generated or used. Presenting 735 the matrix can also include presenting the determined action for one of the elements of the matrix upon a request from the user. That is, the determined 730 actions may also include manual actions such as a notification or instructions to be displayed to a user when the user clicks, hovers, or otherwise manipulates the user interface to select one of the elements of the matrix.

Figure 8:
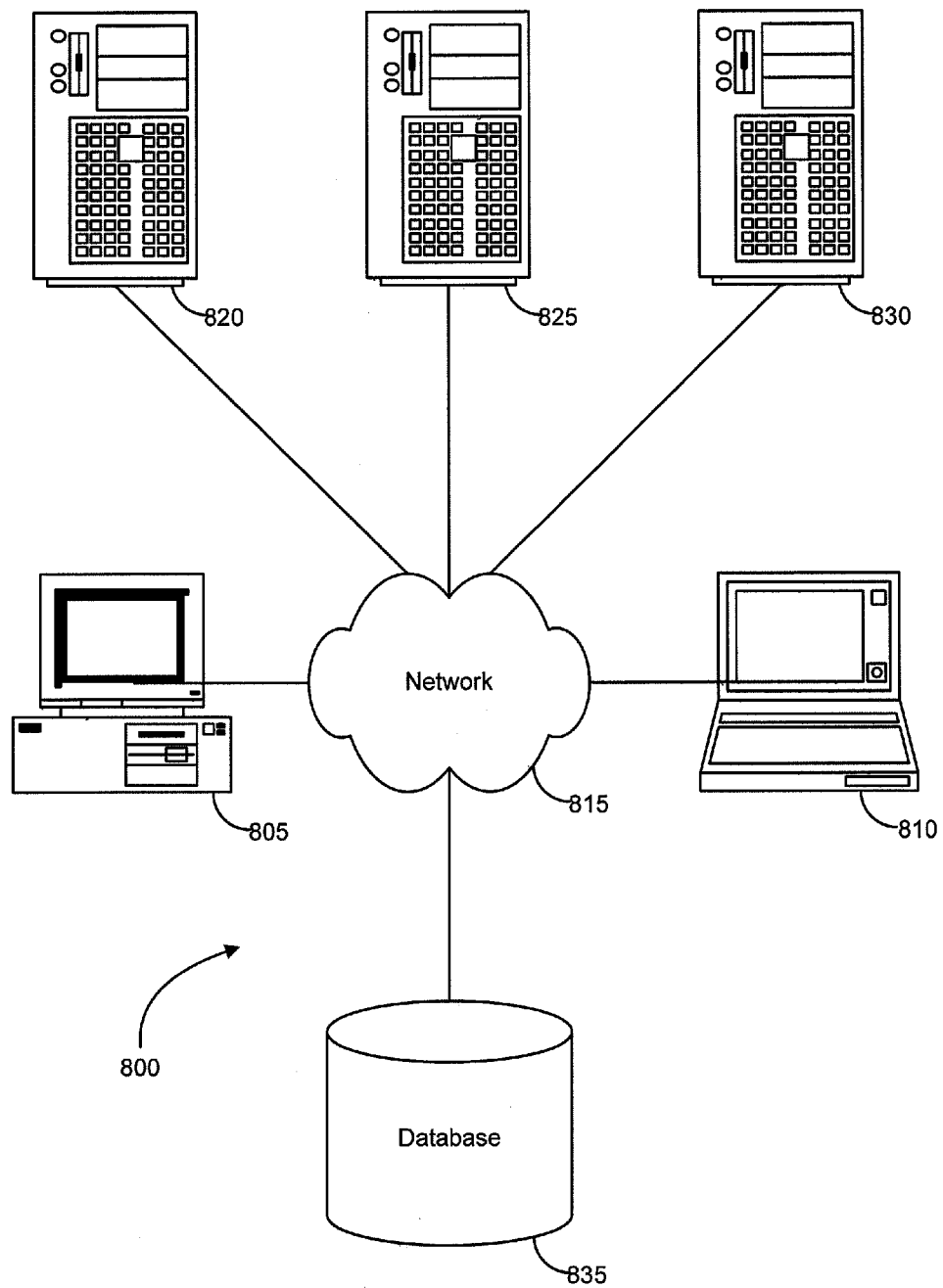
FIG. 8 is a block diagram illustrating components of an exemplary operating environment in which various embodiments of the present invention may be implemented.

FIG. 8 is a block diagram illustrating components of an exemplary operating environment in which various embodiments of the present invention may be implemented. The system 800 can include one or more user computers 805, 810, which may be used to operate a client, whether a dedicate application, web browser, etc. The user computers 805, 810 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems, Android, Chrome, etc.). These user computers 805, 810 may also have any of a variety of applications, including one or more development systems, database client and/or server applications, and web browser applications. Alternatively, the user computers 805, 810 may be any other electronic device, such as a thin-client computer, Internet-enabled mobile telephone, and/or personal digital assistant, capable of communicating via a network (e.g., the network 815 described below) and/or displaying and navigating web pages or other types of electronic documents. Although the exemplary system 800 is shown with two user computers, any number of user computers may be supported.

In some embodiments, the system 800 may also include a network 815. The network may be any type of network familiar to those skilled in the art that can support data communications using any of a variety of commercially-available protocols, including without limitation TCP/IP, SNA, IPX, AppleTalk, and the like. Merely by way of example, the network 815 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 820, 825, 830 which can be general purpose computers and/or specialized server computers (including, merely by way of example, PC servers, UNIX servers, mid-range servers, mainframe computers rack-mounted servers, etc.). One or more of the servers (e.g., 830) may be dedicated to running applications, such as a business application, a web server, application server, etc. Such servers may be used to process requests from user computers 805, 810. The applications can also include any number of applications for controlling access to resources of the servers 820, 825, 830.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 805, 810. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and others, which can process requests from database clients running on a user computer 805, 810.

In some embodiments, an application server may create web pages dynamically for displaying on an end-user (client) system. The web pages created by the web application server may be forwarded to a user computer 805 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 800 may also include one or more databases 835. The database(s) 835 may reside in a variety of locations. By way of example, a database 835 may reside on a storage medium local to (and/or resident in) one or more of the computers 805, 810, 815, 825, 830. Alternatively, it may be remote from any or all of the computers 805, 810, 815, 825, 830, and/or in communication (e.g., via the network 820) with one or more of these. In a particular set of embodiments, the database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. In one set of embodiments, the database 835 may be a relational database, such as Oracle 10g, that is adapted to store, update, and retrieve data in response to SQL-formatted commands and non-SQL DB.

Figure 9:
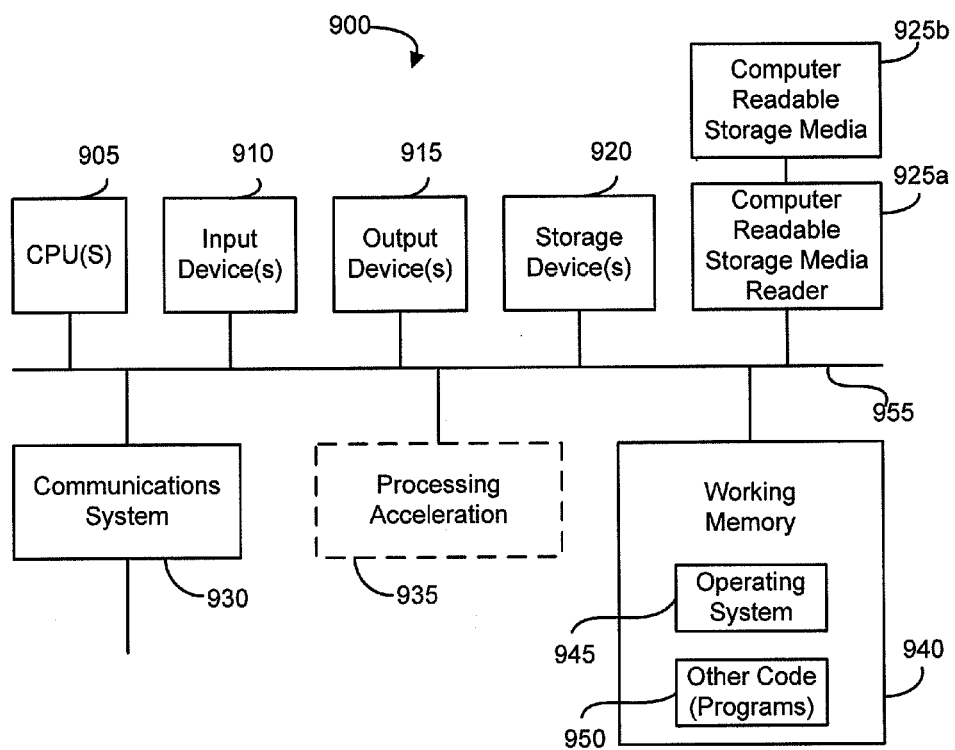
FIG. 9 is a block diagram illustrating an exemplary computer system in which embodiments of the present invention may be implemented.

FIG. 9 illustrates an exemplary computer system 900, in which various embodiments of the present invention may be implemented. The system 900 may be used to implement any of the computer systems described above. The computer system 900 is shown comprising hardware elements that may be electrically coupled via a bus 955. The hardware elements may include one or more central processing units (CPUs) 905, one or more input devices 910 (e.g., a mouse, a keyboard, etc.), and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925a, a communications system 930 (e.g., a modem, a network card (wireless or wired), an infra-red communication device, etc.), and working memory 940, which may include RAM and ROM devices as described above. In some embodiments, the computer system 900 may also include a processing acceleration unit 935, which can include a DSP, a special-purpose processor and/or the like.

The computer-readable storage media reader 925a can further be connected to a computer-readable storage medium 925b, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as an application program (which may be a client application, web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed. Software of computer system 900 may include code 950 for implementing embodiments of the present invention as described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for presenting a summary of information represented in a set of collected messages, the method comprising:
   reading a plurality of messages, each message related to an object associated with an enterprise application;
   tagging each of the plurality of messages to associate at least one descriptive tag to each message;
   categorizing each of the plurality of messages into one or more of a plurality of categories based on the tag associated with each of the messages and a pre-defined association of each of the categories to a tag property;
   quantifying each of the plurality of categories based on the messages in each category and as a percentage of all of the plurality of messages;
   weighting each of the quantified categories;
   assigning the quantified and weighted categories to a plurality of elements of a multi-dimensional matrix; and
   determining an action for each of the plurality of elements of the matrix based on a predefined action associated with a weight for the quantified and weighted categories and tags and associating the determined action with the element of the matrix.

2. The method of claim 1, wherein weighting each of the quantified categories comprises applying a predefined weight for each category.

3. The method of claim 1, further comprising presenting the matrix with the assigned quantified and weighted categories to a user.

4. The method of claim 3, further presenting the determined action for one of the elements of the matrix upon a request from the user.

5. A system comprising:
   a processor; and
   a memory communicatively coupled with and readable by the processor and having stored therein a sequence of instructions which, when executed by the processor, cause the processor to present a summary of information represented in a set of collected messages by reading a plurality of messages, each message related to an object associated with an enterprise application, tagging each of the plurality of messages to associate at least one descriptive tag to each message, categorizing each of the plurality of messages into one or more of a plurality of categories based on the tag associated with each of the messages and a pre-defined association of each of the categories to a tag property, quantifying each of the plurality of categories based on the messages in each category and as a percentage of all of the plurality of messages, weighting each of the quantified categories, assigning the quantified and weighted categories to a plurality of elements of a multi-dimensional matrix, and determining an action for each of the plurality of elements of the matrix based on a predefined action associated with a weight for the quantified and weighted categories and tags and associating the determined action with the element of the matrix.

6. The system of claim 5, wherein weighting each of the quantified categories comprises applying a predefined weight for each category.

7. The system of claim 5, further comprising presenting the matrix with the assigned quantified and weighted categories to a user.

8. The system of claim 7, further presenting the determined action for one of the elements of the matrix upon a request from the user.

9. A machine-readable memory device having stored therein a sequence of instructions which, when executed by a processor, causes the processor to present a summary of information represented in a set of collected messages by:
   reading a plurality of messages, each message related to an object associated with an enterprise application;
   tagging each of the plurality of messages to associate at least one descriptive tag to each message;
   categorizing each of the plurality of messages into one or more of a plurality of categories based on the tag associated with each of the messages and a pre-defined association of each of the categories to a tag property;
   quantifying each of the plurality of categories based on the messages in each category and as a percentage of all of the plurality of messages;
   weighting each of the quantified categories;
   assigning the quantified and weighted categories to a plurality of elements of a multi-dimensional matrix; and
   determining an action for each of the plurality of elements of the matrix based on a predefined action associated with a weight for the quantified and weighted categories and tags and associating the determined action with the element of the matrix.

10. The machine-readable memory of claim 9, wherein weighting each of the quantified categories comprises applying a predefined weight for each category.

11. The machine-readable memory of claim 9, further comprising presenting the matrix with the assigned quantified and weighted categories to a user.

12. The machine-readable memory of claim 11, further presenting the determined action for one of the elements of the matrix upon a request from the user.

* * * * *

UNITED STATES PATENT AND TRADEMARK OFFICE
CERTIFICATE OF CORRECTION

PATENT NO. : 8,751,567 B2
APPLICATION NO. : 13/369986
DATED : June 10, 2014
INVENTOR(S) : Chung et al.

It is certified that error appears in the above-identified patent and that said Letters Patent is hereby corrected as shown below:

Title page, column 2, item 57 Abstract, line 3, delete "up a number" and insert -- up of a number --, therefor.

In the Specification

In column 4, line 36, delete "up a" and insert -- up of a --, therefor.

In column 8, line 34, delete "whether the there" and insert -- whether there --, therefor.

In column 9, line 30, delete "manger" and insert -- manager --, therefor.

In column 11, line 11, delete "Manger" and insert -- Manager --, therefor.

In the Claims

In Column 24, line 58, in Claim 10, delete "The machine-readable memory" and insert -- The machine-readable memory device --, therefor.

In Column 24, line 61, in Claim 11, delete "The machine-readable memory" and insert -- The machine-readable memory device --, therefor.

In Column 24, line 64, in Claim 12, delete "The machine-readable memory" and insert -- The machine-readable memory device --, therefor.

Signed and Sealed this
Seventh Day of July, 2015

Michelle K. Lee
*Director of the United States Patent and Trademark Office*